(12) United States Patent
Goker et al.

(10) Patent No.: US 7,436,621 B2
(45) Date of Patent: Oct. 14, 2008

(54) AZIMUTH COMPENSATION USING COMBINATION BUMP PES DETECTION

(75) Inventors: Turguy Goker, Santa Dominga, CA (US); Ming-chih Weng, Los Angeles, CA (US); Jerry Hodges, Costa Mesa, CA (US); Kempton Redhead, Fountain Valley, CA (US)

(73) Assignee: Quantum Corporation, San Jose, CA (US)

( * ) Notice: Subject to any disclaimer, the term of this patent is extended or adjusted under 35 U.S.C. 154(b) by 43 days.

(21) Appl. No.: 11/550,530

(22) Filed: Oct. 18, 2006

(65) Prior Publication Data

US 2007/0285831 A1 Dec. 13, 2007

Related U.S. Application Data

(60) Provisional application No. 60/804,228, filed on Jun. 8, 2006.

(51) Int. Cl.
 *G11B 5/584* (2006.01)
(52) U.S. Cl. ...................... 360/76; 360/77.12
(58) Field of Classification Search ........................ None
 See application file for complete search history.

(56) References Cited

U.S. PATENT DOCUMENTS

| | | | | |
|---|---|---|---|---|
| 4,258,398 | A | | 3/1981 | Bixby et al. |
| 5,629,813 | A | * | 5/1997 | Baca et al. ............... 360/77.12 |
| 5,982,711 | A | * | 11/1999 | Knowles et al. .......... 360/77.12 |
| 6,430,008 | B1 | * | 8/2002 | Trabert et al. ................ 360/317 |
| 6,545,837 | B1 | * | 4/2003 | Tran ......................... 360/77.12 |
| 6,690,535 | B2 | * | 2/2004 | Wang ....................... 360/77.12 |
| 6,700,729 | B1 | * | 3/2004 | Beck et al. ................ 360/77.12 |
| 6,710,967 | B2 | * | 3/2004 | Hennecken et al. ...... 360/77.12 |
| 6,724,559 | B1 | * | 4/2004 | Konishi et al. ........... 360/77.12 |
| 6,724,561 | B1 | * | 4/2004 | Wyman ..................... 360/77.12 |
| 6,757,128 | B2 | * | 6/2004 | Yip .......................... 360/77.12 |
| 6,781,784 | B2 | * | 8/2004 | Peterson .................. 360/77.12 |
| 6,914,744 | B1 | * | 7/2005 | Wang ....................... 360/77.12 |
| 6,937,425 | B2 | | 8/2005 | Knowles et al. .......... 360/77.12 |
| 7,054,097 | B1 | * | 5/2006 | Yip et al. .................. 360/77.12 |
| 7,245,450 | B1 | * | 7/2007 | Cherubini et al. ........ 360/73.12 |
| 7,328,138 | B1 | * | 2/2008 | Trabert et al. ............... 702/191 |

(Continued)

OTHER PUBLICATIONS

Biskeborn, R.G., and J.H. Eaton., "Hard-disk-drive technology flat heads for linear tape recording," IBM J. Res. & Dev., vol. 47, No. 4, Jul. 2003, pp. 385-400.

*Primary Examiner*—Andrew Sniezek
*Assistant Examiner*—James L Habermehl
(74) *Attorney, Agent, or Firm*—Baker Botts L.L.P.

(57) ABSTRACT

An example embodiment provides for an apparatus and method, for use in a tape drive system, that supplies tape azimuth error information transduced from servo read elements that are located on differing bumps of a magnetic read/write head. Non-azimuth error information is also transduced from servo read elements located on a read bump. The azimuth error and non-azimuth are utilized to correctly place the magnetic head at a currently selected track of the tape for which data is being written. In one implementation, the servo read elements utilized for transducing the azimuth information are substantially aligned with each other relative to a tape path and disposed on separate bumps. In another implementation, the servo read elements utilized for transducing the azimuth information are not substantially aligned with each other and are disposed diagonally on opposite bumps.

20 Claims, 13 Drawing Sheets

U.S. PATENT DOCUMENTS

2004/0120070 A1* 6/2004 Ito ......................... 360/77.12
2006/0103968 A1* 5/2006 Jurneke .................. 360/77.12
2007/0230033 A1* 10/2007 McAllister et al. ....... 360/77.12

* cited by examiner

"PRIOR ART"

"PRIOR ART"

"PRIOR ART"

AZIMUTH COMPENSATION USING COMBINATION BUMP PES DETECTION

CROSS-REFERENCE TO RELATED APPLICATIONS

This application claims the benefit of U.S. Provisional Patent Application No. 60/804,228 filed on Jun. 8, 2006, which is incorporated herein by reference.

BACKGROUND

High-density recording on multiple tracks of a magnetic tape is known. In certain arrangements, parallel tracks extend along a longitudinal direction of the magnetic tape. Magnetic tape is moved transversely across a magnetic head so that a read and/or write element of the magnetic head is moved in proximity to the desired track. During recording or playback, the read/write elements of the head should be aligned with the desired track as the tape moves in a longitudinal direction across the read/write bump. To increase storage capacities, track density, which is the number of tracks per distance (e.g., inches), has gradually increased. As this track density increases, the track pitch and width decrease. For proper read/write operation, the read/write element of the magnetic head should stay at, or very near, the center line of the track. Due to this reduced track pitch, improvements to the head positioner are needed to minimize the offset between the read/write elements of the head and the center line of the track. To that end, servo-based tracking systems employed to allow the tape drive to monitor the head-to-track relationship. If the drive determines that the head and track are offset, then the head positioner corrects the relative position to maintain the relationship between the head and the center line of the track.

Closed loop positioners are often used in tape systems having higher track densities. In high-density tape systems, the tape may wander in the lateral direction as it moves in the longitudinal direction, which results in an offset between the magnetic head and the track center line. To avoid these types of problems, tape cartridges for high-density tape drives are preformatted with information often called servo information, which is used to maintain the correct lateral position of the tape with respect to the magnetic head. Servo information provides the system with feedback to determine the continuous position of the tape relative to the head. Analysis of the servo signals allows for a determination of an offset and the distance of the offset between the track and the head. Based on the information, the head is moved by a positioner to the center line of the track so that write/read operations can occur properly. Closed loop positioners generally use fine positioners to move the head during a write/read operation. These fine positioners are used to maintain the position of the head at the center line of the track under a closed loop servo control using the preformatted servo information on the tape.

The tracking servo system employed by linear tape drives, such as the Linear Tape Open ("LTO") family, is an example of a servo-based, closed loop control mechanism that allows for increased track density. Track density is one of the parameters, besides bit density, that allows storage capacity to increase. The tracking servo system requires feedback to indicate the relative position of the tape and the recording head elements. One of the methods employed in linear tape drives using such feedback signals is to pre-record a series of magnetic stripes that contain position feedback information, which is a timing-based signal. When the stripes are recorded with predetermined azimuth angles, the signals from the head can be processed to decode the lateral position information regarding the relative position of the head and the tape.

The decoding of the lateral position information is based on timing of the detected pulses. As the magnetic head moves from one track on the tape to another, the timing of the pulses changes indicating the position feedback signal. Variations in a tape travel path relative to the magnetic head will typically lead to read after write ("RAW") errors. RAW errors can occur because a read bump, on the magnetic head, used to verify data written by an adjacent write bump, will be reading at a location on the tape where data was not written by the write bump.

In view of the foregoing, a need exists in the art for tape drives that accurately re-position the magnetic head when the tape travel path changes.

The foregoing examples of the related at and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, apparatuses and methods which are meant to be exemplary and illustrative, not limiting In scope. In various embodiments, one or more of the above-described problems have been reduced or eliminated.

One embodiment by way of non-limiting example provides for an apparatus and method, for use in a tape drive system, that supplies tape azimuth error information transduced from servo read elements that are located on different bumps of a magnetic read/write head of a tape drive. Non-azimuth error information, in one implementation, is also transduced from servo read elements located on the same read bump. The azimuth error and non-azimuth are utilized to correctly place the magnetic head at a currently selected track of the tape for which data is being written. In one implementation, the servo read elements utilized for transducing the azimuth information are substantially aligned with each other relative to a tape path and disposed on opposite bumps. In another implementation, the servo read elements utilized for transducing the azimuth information are not substantially aligned with each other and diagonally opposed on opposite bumps.

In addition to the example aspects and embodiments described above, further aspects and embodiments will become apparent by reference to the drawings and by study of the following descriptions.

BRIEF DESCRIPTION OF THE DRAWINGS

Example embodiments are illustrated in referenced figures of the drawings. It is intended that the embodiments and figures disclosed herein are to be considered illustrative rather than limiting.

DESCRIPTION OF EXAMPLE EMBODIMENTS

The following embodiments and aspects thereof are described and illustrated in conjunction with systems, apparatuses and methods which are meant to be exemplary and illustrative, not limiting in scope.

Figure 1:
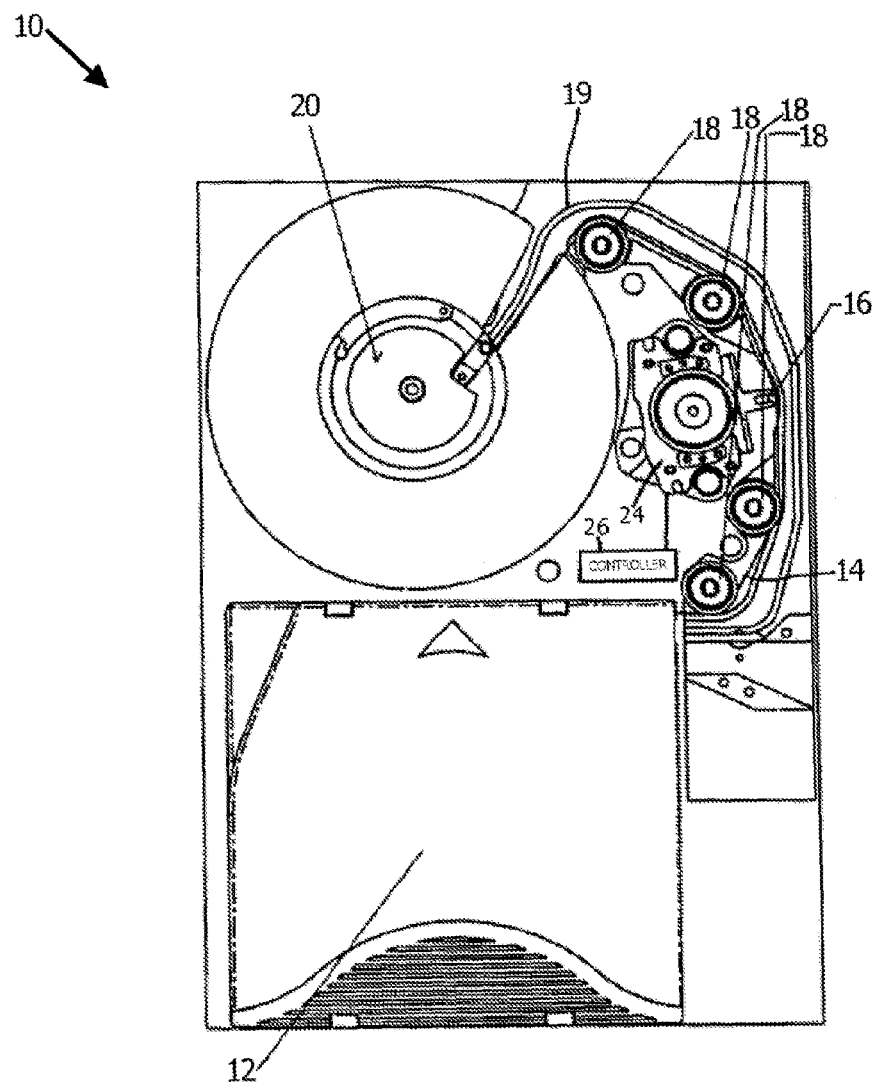
FIG. 1 illustrates a depiction of typical linear tape drive which utilizes the claimed embodiments.

FIG. 1 shows an example embodiment of a tape drive 10 utilizing the claimed embodiments. The claimed embodiments may also be used with other types of tape drives, but the claimed embodiments are being described with respect to the drive of FIG. 1 for purposes of explanation. The figure shows the tape drive 10 in a normal plan view. Tape cartridge 12 is inserted into the tape drive 10. Tape 14 is depicted as threaded into the take-up hub assembly 20. Tape 14 is guided by tape guides 18 past the magnetic head 16. A guide track 19 is used to guide a tape leader between the tape cartridge 12 and the take-up hub assembly 20. A head positioning mechanism is schematically indicated as block 24 and coupled to the magnetic head 16. In response to control signals from a controller 26, the head positioning mechanism 24 adjusts the position of the magnetic head 16. The controller 26 generates these control signals in response to the detected servo stripes prerecorded on the tape 14.

Figure 2:
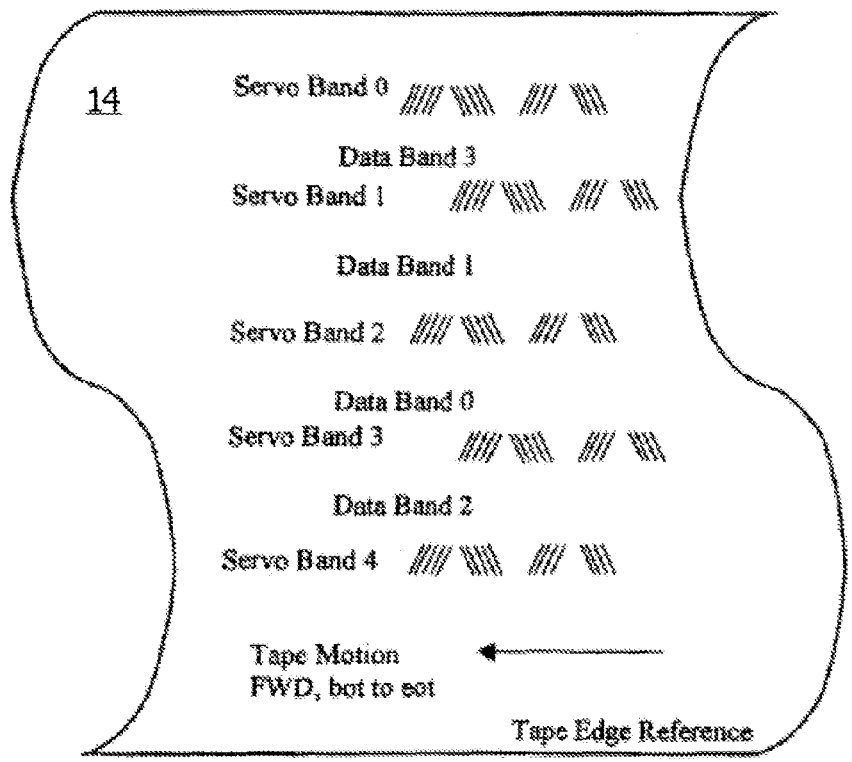
FIG. 2 is a schematic depiction of a LTO position error signal ("PES") format pre-recorded on a tape.

Referring to FIG. 2, an example LTO PES servo format is schematically decided. There are five servo bands, 0-4, laterally spaced apart from one another. In between the servo bands are four data bands, 0-3. In the LTO format, the PES feedback is defined as the timing based servo system. The timing pulse is generated by the detection of the servo stripes and is decoded into ratios whereby the tracking algorithm formulates the PES. The labeling "bot" and "eot" on FIG. 2 refers to "beginning of tape" and "end of tape," respectively. Of course, the servo bands can be arranged in other configurations relative to the data tracks or bands.

Figure 3:
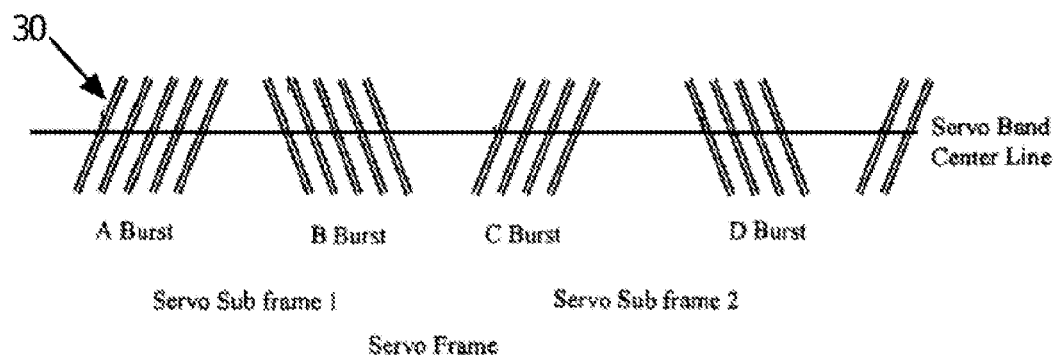
FIG. 3 is a detailed schematic depiction of a PES format of pre-recorded servo stripes on a pre-formatted tape.

Referring also now to FIG. 3, a servo stripe 30 comprises two magnetic transitions that are typically spaced 2.1 microns apart. As depicted in FIG. 3, the servo stripes 30 are arranged in groups, referred to as servo bursts. There are four distinct types of servo bursts, A, B, C, and D. The A and B bursts both consist of five stripes, while the C and D bursts are four stripes each. The relative spacing of these stripes within each group provides encoded linear tape position information (LPOS).

Figure 4:
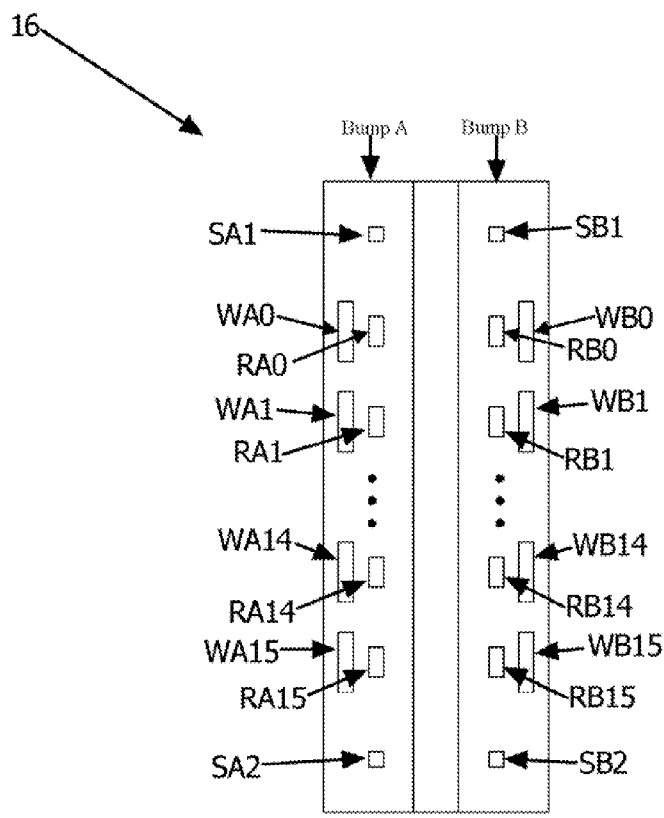
FIG. 4 is a block diagram illustrating a typical arrangement of servo read elements, write elements and read elements on bumps of a magnetic head.

FIG. 4 is a block diagram illustrating an arrangement of servo read elements (SA1, SA2, SB1, SB2), write elements (WA0-WA15, WB0-WB15) and read elements (RA0-RA15, RB0-RB15) on bumps A and B of the magnetic head 16. Referring back to FIG. 1, as tape 14 is wound from cartridge 12 to take-up hub assembly 20, bump A, via write elements WA0-WA15, will typically be utilized to write data to the tape 14 and the written data will then be verified by bump B, via corresponding read elements (RB0-RB15). In a similar manner, when tape 14 is wound from the take-up hub assembly 20 to the cartridge 12, bump B, via write elements WB0-WB15, will typically be utilized to write data to the tape 14 and the written data will then be verified by bump A, via corresponding read elements (RA0-RA15). Servo read elements (SA1, SA2, SB1, SB2) transduce the PES signal encoded on the servo bands, such as servo bands 2 and 3 while writing at data band 0 of FIG. 2, and relays the information back to controller 26 which in turn provides the head positioning mechanism 24 with information to correctly align the magnetic head 16 relative to the tape 14. It warrants repeating that the example LTO PES servo format depicted in FIG. 2 is just that—example. As a result, the arrangement of read elements shown in FIG. 4 will not necessarily correspond to the LTO PES servo format of FIG. 2.

Typically, when one of the bumps (A or B) is writing data, servo read elements on the other or opposite bump are used to transduce PES signals from the tape. This is done because the current required to write data is typically much greater than it is to read data. Due to the high current at the write bump, PES signals collected from servo read elements on the write bump are typically very noisy and therefore hard to utilize. Using PES signals transduced from a read bump introduces an amount of error to the location of where data is written onto a tape by the write bump due to the physical separation between the two bumps. Restated, PES signals are transduced at a vertical location, relative to the tape path, different from where the actual data is being written. For prior art tape drive systems, the amount of error typically will not cause RAW errors For increasing track densities, however, RAW errors will become more prevalent without improvements to prior art systems.

Figure 5:
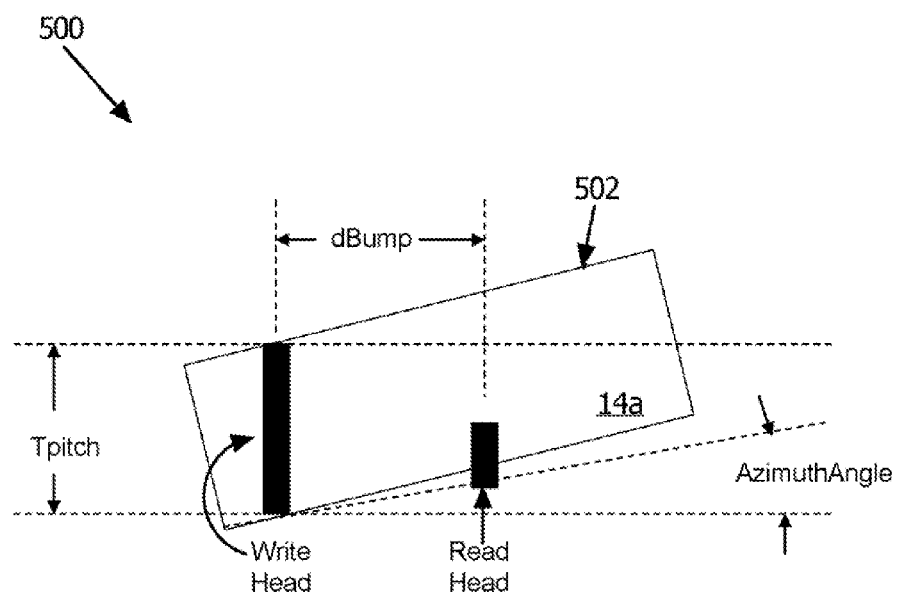
FIG. 5 is a block diagram illustrating read after write error of a track due to misplacement of the magnetic head and a track on a portion of the tape, relative to each other.

An example of how a RAW can occur can be seen via FIG. 5, which is a block diagram 500 illustrating a RAW error of a track due to misplacement of the magnetic head and a written track 502 on a portion of the tape 14, relative to each other. As can be seen, a write head writes data onto track 502. However, track 502 is angled relative to the write head. As a result, the read head is not fully contained with the written track 502 and therefore can not properly read/verify the written data and that results in a RAW. Also included in FIG. 5 is dBump—the distance between bumps of a magnetic head, Tpitch—the pitch of a track and the azimuth angle which will be described in more detail in a later section.

Figure 6:
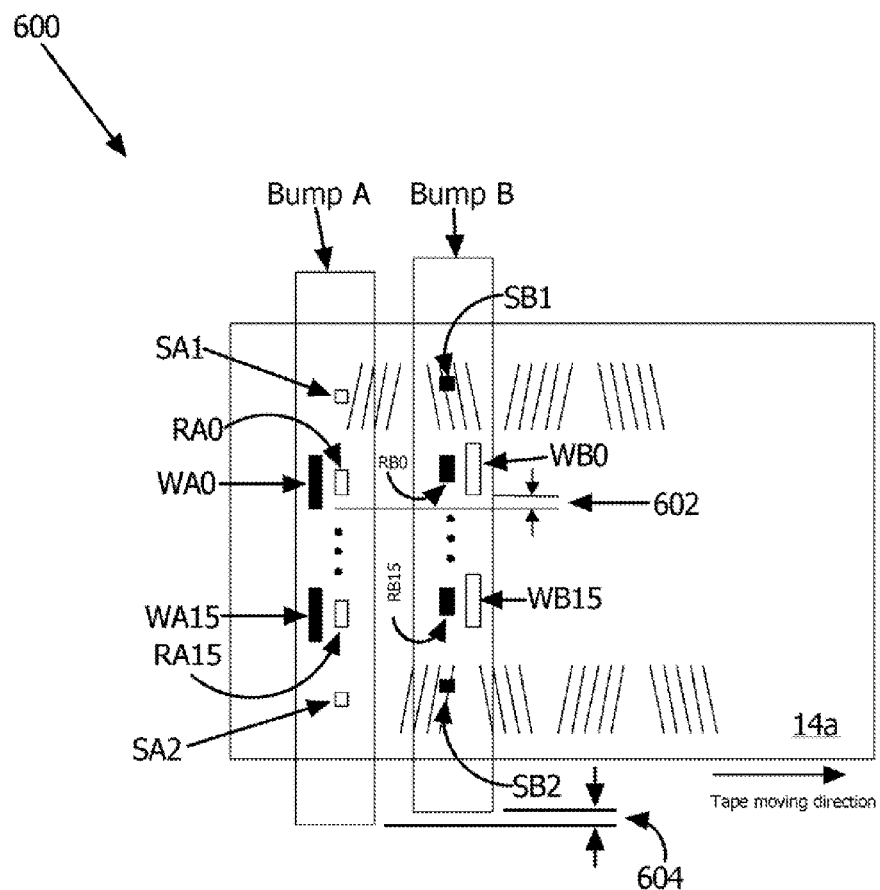
FIG. 6 is a block diagram illustrating track-to-track offset due to bump-to-bump offset in relation to the portion of the tape.

There are a number of conditions that contribute to the magnetic head 16 not being properly aligned to a track on tape 14 and these conditions will be explored via FIGS. 6-9. FIG. 6 is a block diagram 600 illustrating track-to-track offset 602 due to bump-to-bump offset 604 in relation to the portion 14a of the tape 14. Active elements are in black and includes write elements (WA0-WA15) on bump A, read elements (RB0-RB15) on bump B and servo read elements (SB1, SB2) on bump B. Bump-to-bump offset occurs due to manufacturing limitations in being able to place bumps, such as bump A and bump B, in perfect alignment with each other. Typically, bump-to-bump offset 604 is known and can be compensated for in terms of a DC offset to be combined with a transduced PES signal.

Figure 7:
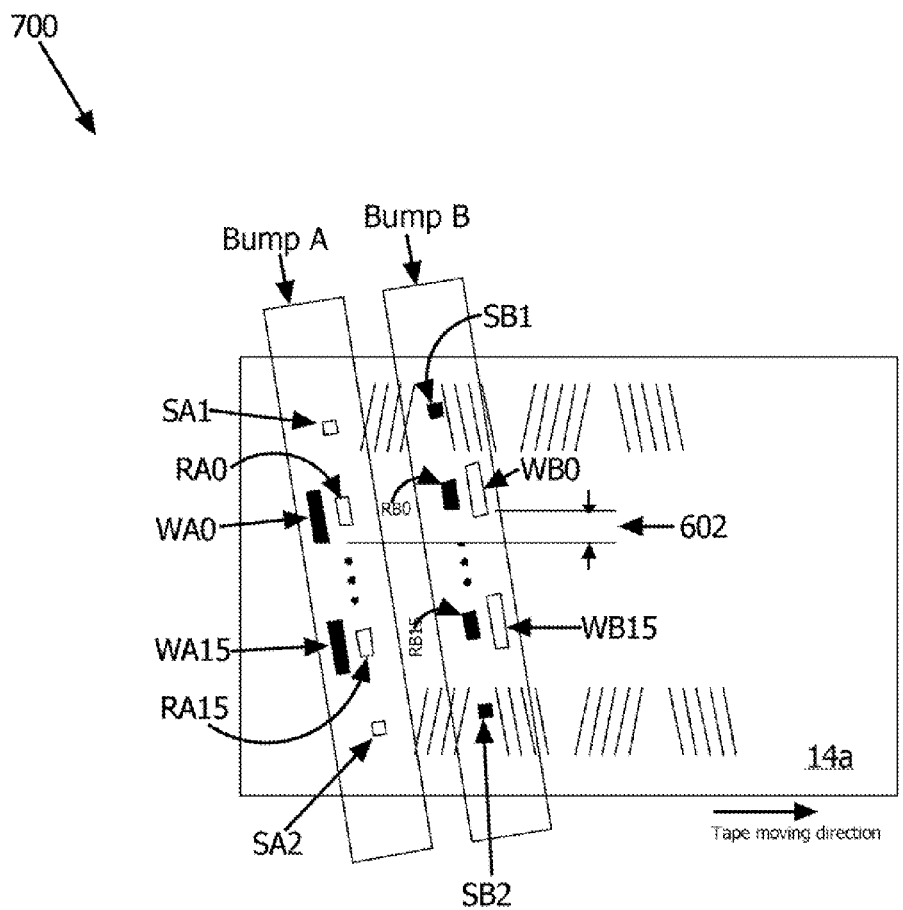
FIG. 7 is a block diagram illustrating magnetic head tilt in relation to the portion of the tape.

In tape drive systems where bump-to-bump offset is minimal, track offset 602 can still occur and this is shown in FIG. 7 which is a block diagram 700 illustrating magnetic head tilt in relation to the portion 14a of the tape 14 As can be seen, bumps A and B are both tilted while tape portion 14a is optimally oriented. In this instance servo read elements SB1 and SB2 will transduce a PES signal that will be indicated to the controller 26 to signal actuators in the head positioning mechanism 24 to re-align magnetic head 16 to be in alignment with tape portion 14a. Typically, magnetic head tilt is known and can be compensated for in terms of a DC offset to be combined with a transduced PES signal.

Figure 8:
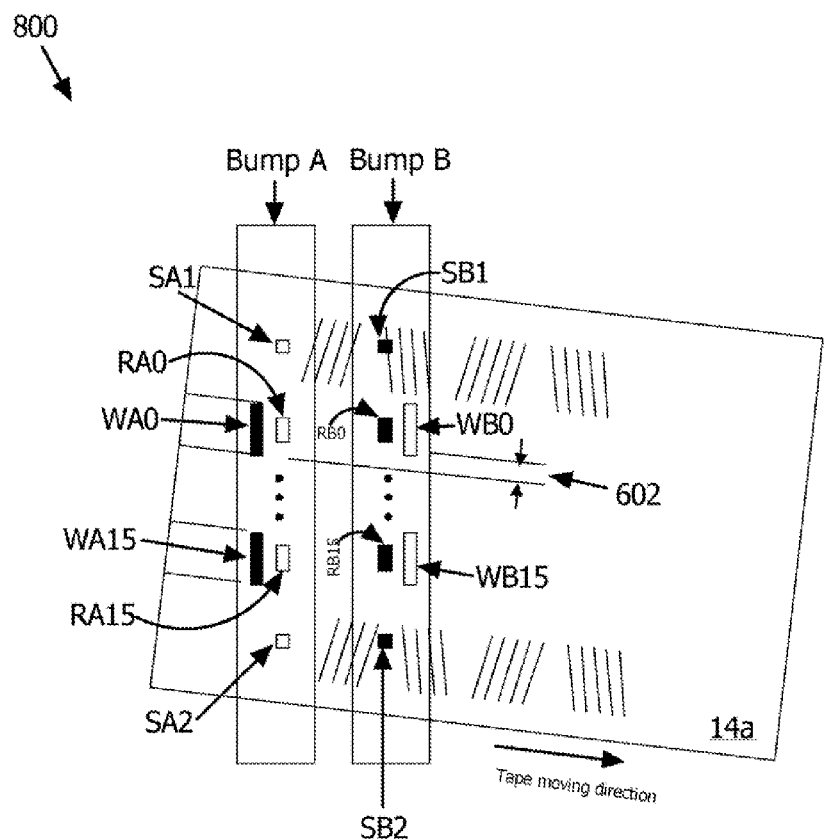
FIG. 8 is a block diagram illustrating tape skew in relation to the portion of the tape.

Even if bump-to-bump offset is minimal, the tape 14 could be traveling at an angle as compared to the magnetic head 16 such as depicted in FIG. 8 which is a block diagram 800 illustrating tape skew in relation to the portion 14a of the tape 14. Similar to the magnetic head tilt situation of FIG. 7, servo read elements (SB1, SB2) on bump B will transduce a PES signal for which controller 26 will utilize to signal the head positioning mechanism 24 to re-align the magnetic head 16 to be in alignment with tape portion 14a. Contrary to bump-to-bump offset of FIG. 6 and magnetic head tilt of FIG. 7, the tape skew varies as tape moves from reel to reel.

The scenario of FIG. 6-8 generally refers to lateral tape motion ("LTM") and includes tape dimensional change as components. It should be noted that tape dimensional change is not depicted in FIG. 6-8.

Figure 9:
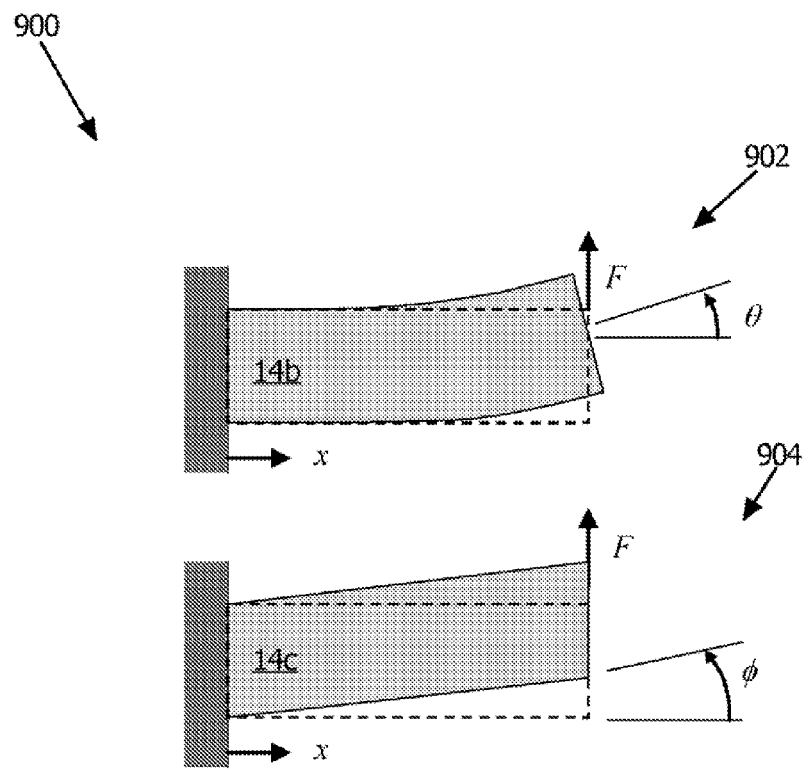
FIG. 9 is a block diagram illustrating components of tape skew.

Tape skew includes two components and these components are shown in FIG. 9 which is a block diagram 900 illustrating those components. Specifically, tape skew includes rotational deformation 902 and shear deformation 904 as indicated by tape portions 14b and 14c respectively. Rotational deformation 902 is different from shear deformation 904 in that one part of tape portion 14b more or less is traveling along a longitudinal path while another part of tape portion starts to angle away from a horizontal travel path. Shear deformation involves tape portion 14c being evenly angled at a particular degree Ø. In reference to the "F" axis, "F" stands for force. The force to cause the tape 14 to exhibit rotational and shear deformation could be caused, for example, by components in the tape drive system that guide tape 14 through the system. These components could be, for example, take-up hub assembly 20 and/or tape guides 18.

As indicated by FIG. 6-8, LTM is corrected via PES signals transduced by servo read elements (SB1, SB2) on the non-writing bump (bump B in a forward tape direction—from a tape cartridge top a take-up hub of a tape drive) in prior art systems. Tape skew is corrected by measuring the difference of servo stripes arrival time between servo read elements (SB1, SB2) on the non-writing bump in prior art systems. Studies have shown that correcting LTM via opposite/non-writing/read bump servo read elements is generally accurate. However, studies have also shown that tape skew information detected in the servo stripes arrival time collected from the non-writing bump has significant error. More specifically, it is the shear deformation component of tape skew that has significant error when measured by servo read elements on the non-writing bump.

As previously mentioned, a bump being used to write data typically will employ a considerable amount of current and that amount of current has prevented prior art systems from utilizing the servo read elements of a write bump for transducing a PES signal due to noise issues. The claimed embodiments have advantageously solved those deficiencies of the prior art. This has been accomplished by using a servo read element from the write bump and a servo read element from the non-writing/opposite bump for transducing tape skew PES signals. Before the transduced tape skew PES signal is fed back to the head positioning mechanism 24, they are low-pass filtered to remove any high-frequency noise. This is done to obtain a cleaner signal as tape skew is typically low frequency and the filter removes high frequency noise. LTM PES signals are transduced using the non-writing/opposite bump PES signals. In one implementation, substantially-aligned servo read elements are utilized to transduce the azimuth PES signal. The substantially-aligned servo read elements are substantially aligned relative to a tape path. It should be noted that the claimed embodiments can utilize either pairing of servo read elements to transduce the azimuth PES signal—SA1 and SB1 or SA2 and SB2.

In another embodiment, servo read elements utilized to transduce the azimuth PES signal are not substantially-aligned with each other. An example of this would be to use servo read elements SA1 and SB2 or SA2 and SB1. Similar to the substantially-aligned embodiment, either pairing of servo read elements can be utilized.

Figure 10:
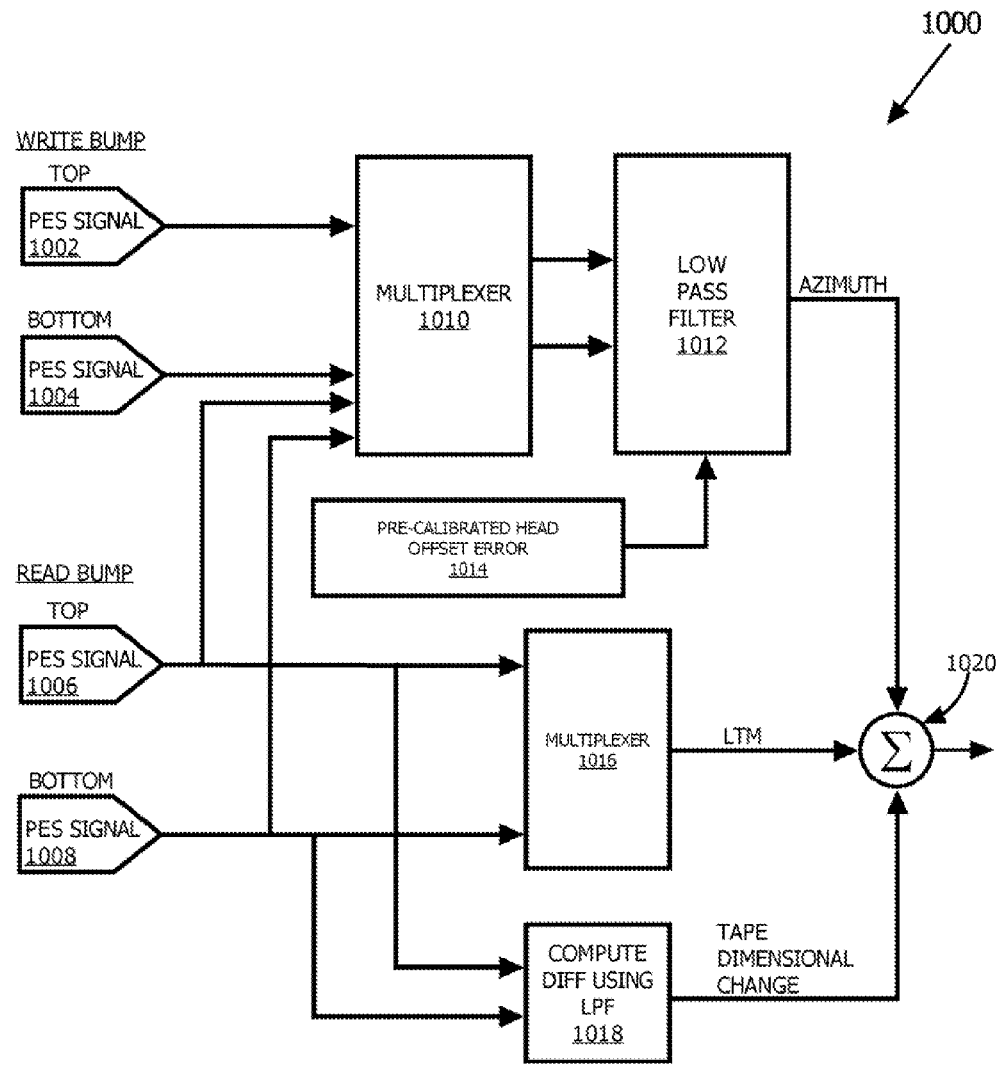
FIG. 10 is a block diagram illustrating combination PES detection, in accordance with an example embodiment.

An example of how the claimed embodiments can be implements is shown in FIG. 10 which is a block diagram 1000 illustrating combination PES detection, in accordance with an example embodiment. The term "combination" refers to using PES signals from both bumps—the write bump and the read bump. Succinctly, block diagram 1000 provides for selection of either top, substantially-aligned PES signal inputs (1002, 1006) or bottom, substantially-aligned PES signal inputs (1004, 1008). After the selection is made, the difference of the selected signals are low pass filtered and adjusted for any offset between bumps and an azimuth component of the PES signal is obtained. For the LTM portion of the PES signal, a top or bottom PES signal is selected from the read bump. For the tape dimensional change portion, a difference between the top and bottom PES signals of the read bump is low pass filtered. All three processed signals are then combined and sent to the head positioning mechanism 20 to make adjustments, if any, to the magnetic head 16. The corresponding components of block diagram will typically be contained in the controller 26.

As indicated above, block diagram 1000 includes top and bottom PES signal inputs (1002, 1004, 1006, 1008) for both the write and read bumps. The azimuth processing section includes a multiplexer 1010, a low pass filter 1012 and a pre-calibrated offset error 1014 The LTM processing section includes a multiplexer 1016 and a computation block 1018. Block diagram 1000 also includes a summing junction 1020.

For the azimuth portion of the PES signal, multiplexer 1010 selects either a pairing of the top PES signal inputs (1002, 1006) from each bump or the bottom PES signal inputs (1006, 1008) from each bump. After the selection, the difference between the selected signals is low pass filtered by filter 1012. The offset information from offset error block 1014 are applied to the filtered signal as a reference. This offset information, from offset error block 1014, is the LTM offset that is required to correct actual written track locations in the LTM direction if no azimuth PES is available.

Selection of the top or bottom PES signal inputs, in one implementation, is based on signal to noise ratio. The pair of PES signal inputs with the better signal to noise ratio would be selected.

For the LTM portion of the PES signal, multiplexer 1016 will select either a top or bottom PES signal input (1006 or 1008) from the read bump. This selection, in one implementation is made based on the best signal to noise ratio. For the tape dimensional change, the difference between the top and bottom PES signal inputs (1006, 1008) is used to compute the tape dimensional change.

After all three terms (azimuth, LTM and tape dimensional change) have been computed, they are combined at the summing junction 1020 and the combined signal is fed back to the head positioning mechanism 20 to make adjustments, if any, to the magnetic head 16.

Referring back to the embodiment of using servo read elements that are not substantially-aligned with each other, for example using PES signal inputs 1002 and 1008 or 1004 and 1006, the calculation is somewhat different for the azimuth portion of the PES signal. If the PES signal inputs 1002 and 1008 are utilized, the tape dimensional change will additionally be subtracted from the difference of the 1002 and 1008 inputs. If the 1004 and 1006 PES signal inputs are utilized, the LTM portion of the signal will additionally be subtracted from the difference of the 1004 and 1006 PES signal inputs.

Figure 11:
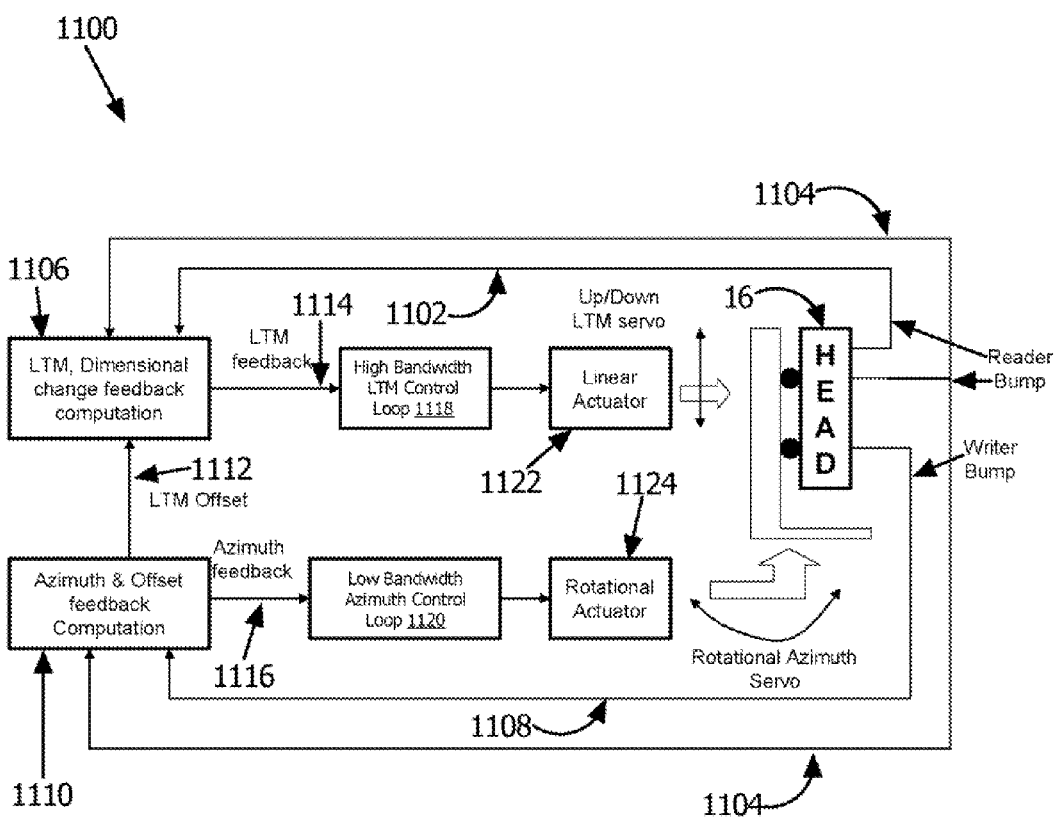
FIG. 11 is a block diagram illustrating how combination PES detection is utilized to properly align the magnetic head with a track on the tape, in accordance with an example embodiment.

A typical circuit routing of the processed PES signals to the head positioning mechanism 24 is shown via FIG. 11 which is a block diagram 1100 illustrating how combination PES detection is utilized to properly align the magnetic head 16 with a track on the tape 14, in accordance with an example embodiment. As can be seen, two PES signals (1102, 1104) are fed from the reader bump of the magnetic head 16 to an LTM processing module 1106 which will typically be located in the controller 26. Similarly, a PES signal 1108 from the writer bump of the magnetic head is fed to an azimuth processing module 1110. Also, PES signal 1104 from the reading bump is also sent to the azimuth processing module 1110.

LTM offset 1112 corresponds to the azimuth of FIG. 10 and is fed from azimuth processing module 1110 to LTM processing module 1106. After the PES signals (1102, 1104, 1108) are processed, LTM feedback 1114 is sent to high bandwidth LTM control loop 1118 which is in turn sent to the linear actuator 1122 of the head positioning mechanism 24. In a similar manner, the azimuth feedback 1116 is sent to low bandwidth azimuth servo loop 1120 which in turn is sent to the rotational actuator 1124. Linear actuator 1122 is operative to move the magnetic head 16 up and down while the rotational actuator 1124 is operative to rotate the magnetic head 16.

Figure 12:
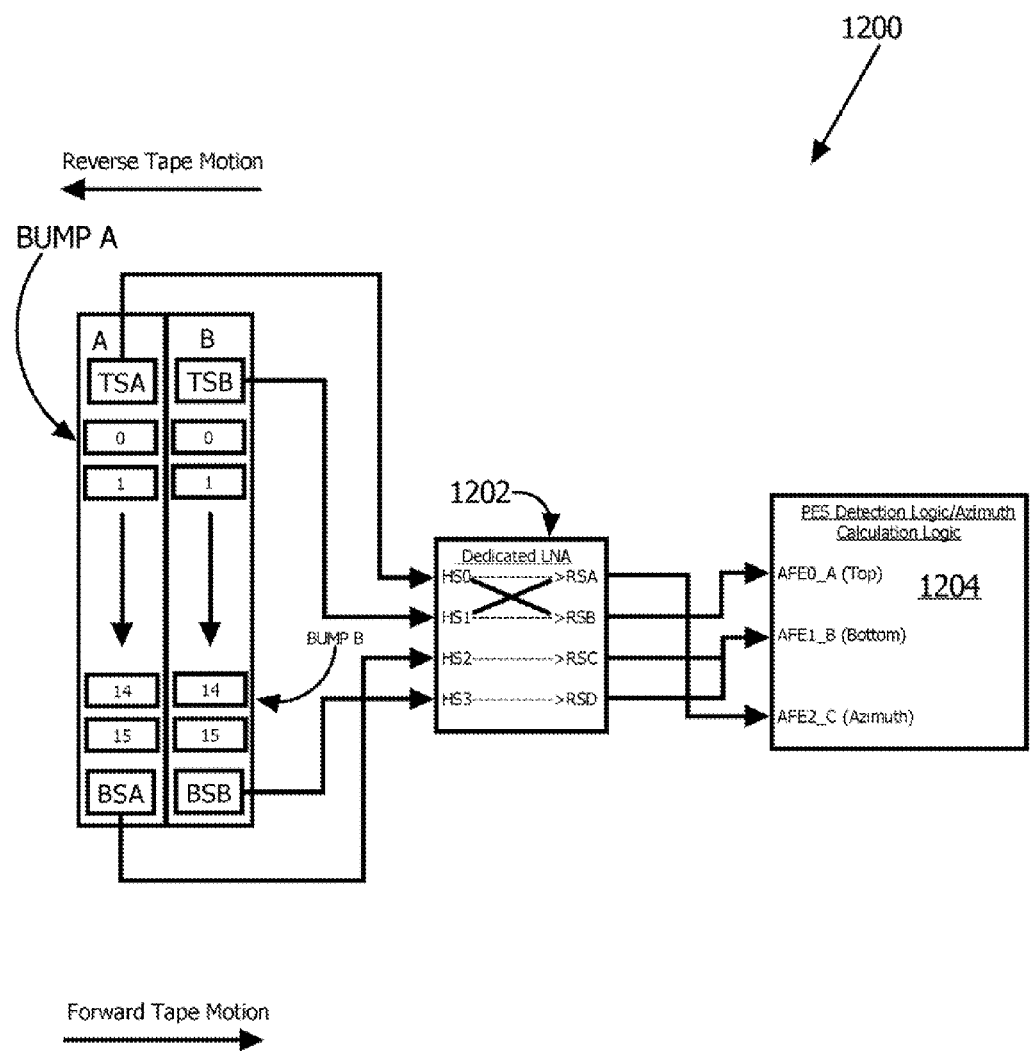
FIG. 12 is a block diagram illustrating an electrical interface configuration that can be used to implement combination PES detection, in accordance with an example embodiment.

FIG. 12 Is a block diagram 1200 illustrating an electrical interface configuration that can be used to implement combination PES detection, in accordance with an example embodiment. The servo read elements (TSA, TSB, BSA, BSB) are wired, through low noise amplifier ("LNA") 1202, to a single analog front end ("AFE") integrated circuit 1204 dedicated for servo signals from the magnetic head 16 (not shown. The PES detection logic/AFE 1204 includes three inputs, one (1206) of which takes a servo signal from a write bump servo read element to calculate an azimuth value. It should be noted that there are typically several extra AFE integrated circuits that used to handle data channel writers and readers. They are intentionally not included so as to not unintentionally obscure block diagram 1200.

Referring to the LNA 1202, the signal between HS0 and RSA corresponds to forward tape direction azimuth information from servo read element TSA. The signal between HS3 and RSD corresponds to forward opposite bump information from servo read elements TSB and BSB. The signal between HS1 and RSA refers to reverse azimuth information from servo read element TSB. The signal between the pairs of HS0/RSB and HS2/RSC refers to reverse opposite bump information from servo read elements TSA and TSB.

Figure 13:
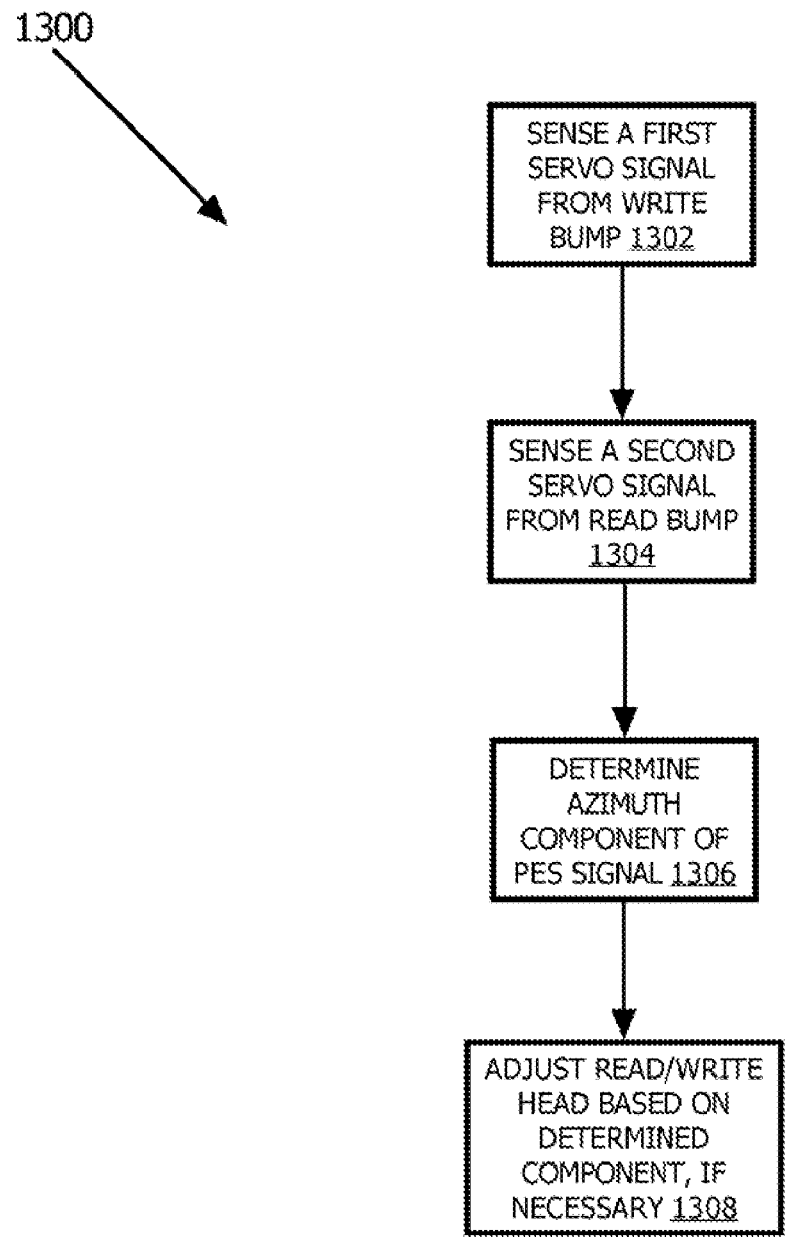
FIG. 13 is a flowchart diagram illustrating a method for determining azimuth compensation information, in accordance with an example embodiment.

FIG. 13 is a flowchart diagram illustrating a method 1300 for determining azimuth compensation information, in accordance with an example embodiment. Method 1300 provides for a tape drive 10 to sense servo signals from a tape 14 at read and write bumps. The sensed servo signals are then used to determine an azimuth component of PES signal. If necessary, a magnetic/read-write head 16 is adjusted based on the azimuth component of the PES signal.

Initially, tape drive 10 senses a first servo signal is sensed from a write bump at operation 1302. Next, tape drive 10 senses a second servo signal from a read bump by the tape drive 10 at operation 1304 In turn, tape drive 10 determines an azimuth component of a PES signal at operation 1306 and adjusts the magnetic head 16, if necessary, at operation 1308.

Advantageously, the claimed embodiments provide for numerous advantages over the prior art. These advantages include providing accurate azimuth information that is sensed at both write and read heads. By detecting azimuth error in this manner, read after write errors are avoided.

While a number of example aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. In a tape drive system, an apparatus comprising:
   a read/write head including first and second bumps wherein the first bump includes at least one first bump read/write element, a first servo read element and a second servo read element, and wherein the second bump includes at least one second bump read/write element, a third servo read element and a fourth servo read element; wherein during a write operation the first bump is a write bump and the second bump is a read bump;
   wherein the first servo read element is substantially aligned with the third servo read element relative to a tape path;
   wherein the second servo read element is substantially aligned with the fourth servo read element relative to the tape path;
   a controller circuit comprising an azimuth processing section connected to receive servo signals provided by the first, second, third and fourth servo read elements during the write operation, the azimuth processing section comprising
      a multiplexer operative to select servo signals from either the first and third servo read elements or the second and fourth servo read elements for output;
      a low pass filter operatively connected to the multiplexer, the low pass filter operative to filter the difference between the servo signals output by the multiplexer; and
   wherein the controller circuit utilizes difference signals output from the low-pass filter to provide an azimuth component of a position error signal during the write operation.

2. The tape drive system as recited in claim 1 wherein the azimuth component of the position error signal is utilized to orient the read/write head relative to a track of a tape.

3. The tape drive system as recited in claim 1 wherein the controller circuit utilizes signals transduced by the third and fourth servo read elements to provide lateral tape motion and tape dimensional change components of the position error signal.

4. The tape drive system as recited in claim 1 wherein the multiplexer selects either the first and third servo read elements or the second and fourth servo read elements for output based on observed signal-to-noise ratios.

5. The tape drive system as recited in claim 1 wherein the controller circuit further comprises a lateral tape motion processing section utilizes servo signals transduced by the third and fourth servo read elements to provide lateral tape motion and tape dimensional change components of the position error signal.

6. The tape drive system as recited in claim 5 wherein the lateral tape motion processing section further utilizes the azimuth component to provide the lateral tape motion and tape dimensional change components of the position error signal.

7. The tape drive system as recited in claim 6 further comprising a lateral tape motion control loop operative to drive a linear actuator connected to read/write head.

8. The tape drive system as recited in claim 6 further comprising an azimuth control loop operative to drive a rotational actuator connected to read/write head.

9. In a tape drive system, a method for keeping a read/write head in alignment with a tape travel path during writing of data to a tape, the method comprising:
sensing, during a write operation, a first servo signal from a first bump of the read/write head;
sensing, during the write operation, a second servo signal from a second bump of the read/write head, wherein either the first or second bump is a write bump during the write operation;
applying a low pass filter to the first and second servo signals;
determining an azimuth component of a position error signal, during the write operation, based on the sensed first and second servo signals output from the low pass filter.

10. The method as recited in claim 9 further comprising:
if realigning is required, realigning the read/write head relative to a track of a tape based on the azimuth component of the position error signal.

11. The method as recited in claim 9 further comprising:
sensing a third servo signal from the second bump;
determining a lateral tape motion component of the position error signal based on the sensed second and third servo signals; and
if realigning is required, realigning the read/write head relative to the track of the tape based on the azimuth and lateral tape motion components of the position error signal.

12. The method as recited in claim 9 wherein the first and second servo signals are transduced from servo read elements that are substantially aligned to each other relative to the tape travel path.

13. The method as recited in claim 9 wherein the first servo signal is transduced from a first servo read element located on an upper half of the first bump and wherein the second servo signal is transduced from a second servo read element located on a lower half of the second bump.

14. The method as recited in claim 9 wherein the first servo signal is transduced from a first servo read element located on a lower half of the first bump and wherein the second servo signal is transduced from a second servo read element located on an upper half of the second bump.

15. In a tape drive system, an apparatus comprising:
a read/write head including first and second bumps wherein the first bump includes at least one first bump read/write element, a first servo read element and a second servo read element, and wherein the second bump includes at least one second bump read/write element, a third servo read element and a fourth servo read element, wherein during a write operation the first bump is a write bump and the second bump is a read bump;
a controller circuit comprising an azimuth processing section connected to receive servo signals provided by the first, second, third and fourth servo read elements during the write operation, the azimuth processing section comprising
a multiplexer operative to select servo signals from the first servo read element and either the third servo read element or the fourth servo read elements for output;
a low pass filter operatively connected to the multiplexer, the low pass filter operative to filter the difference between the servo signals output by the multiplexer;
wherein the controller circuit utilizes difference signals output from the low-pass filter to provide an azimuth component of a position error signal during the write operation; and
wherein the controller circuit utilizes signals transduced by the third and fourth servo read elements to provide a lateral tape motion component of the position error signal during the write operation.

16. The tape drive system as recited in claim 15 wherein the azimuth and lateral tape motion components of the position error signal are utilized to orient the read/write head relative to a track of a tape.

17. The tape drive system as recited in claim 15:
wherein the first servo read element is located on a top half of the first bump;
wherein the second servo read element is located on a bottom half of the first bump;
wherein the third servo read element is located on a top half of the second bump; and
wherein the fourth servo read element is located on a bottom half of the second bump.

18. The tape drive system as recited in claim 17 wherein the first component of the position error signal is based on signals transduced by the second servo read element and the fourth servo read element.

19. The tape drive system as recited in claim 17 wherein the first component of the position error signal is based on signals transduced by the first servo read element and the fourth read servo read element.

20. The tape drive system as recited in claim 17 wherein the first component of the position error signal is based on signals transduced by the first servo read element and the third servo read element.

* * * * *